United States Patent
Breen

(10) Patent No.: US 6,746,021 B2
(45) Date of Patent: Jun. 8, 2004

(54) MLS GASKET WITH CONFORMABLE STOPPER ELEMENT

(75) Inventor: Bryan S. Breen, Walled Lake, MI (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 10/100,739

(22) Filed: Mar. 19, 2002

(65) Prior Publication Data

US 2003/0178789 A1 Sep. 25, 2003

(51) Int. Cl.⁷ .................................................. F02F 11/00
(52) U.S. Cl. ........................................... 277/594; 277/600
(58) Field of Search ................................ 277/543, 594, 277/595, 600, 601, 596

(56) References Cited

U.S. PATENT DOCUMENTS

| | | | | |
|---|---|---|---|---|
| 3,653,674 A | * | 4/1972 | Bennigsen | 277/650 |
| 4,300,779 A | * | 11/1981 | DeCore et al. | 277/601 |
| 4,754,982 A | * | 7/1988 | Udagawa et al. | 277/596 |
| 5,522,604 A | | 6/1996 | Weiss et al. | |
| 5,542,683 A | | 8/1996 | Papendorf et al. | |
| 5,609,345 A | * | 3/1997 | Miura et al. | 277/593 |
| 5,618,049 A | * | 4/1997 | Ueta | 277/595 |
| 5,628,113 A | * | 5/1997 | Tanaka et al. | 29/888.3 |
| 5,628,518 A | * | 5/1997 | Ushio et al. | 277/593 |
| 5,695,200 A | * | 12/1997 | Diez et al. | 277/593 |
| 5,713,580 A | | 2/1998 | Ueta | |
| 5,803,462 A | * | 9/1998 | Kozerski | 277/595 |
| 5,895,054 A | * | 4/1999 | Miyaoh et al. | 277/595 |
| 5,979,906 A | * | 11/1999 | Silvian | 277/593 |
| 6,036,194 A | * | 3/2000 | Stamper | 277/595 |
| 6,126,172 A | | 10/2000 | Okano | |
| 6,315,303 B1 | * | 11/2001 | Erb et al. | 277/593 |
| 6,322,084 B1 | * | 11/2001 | Yamada et al. | 277/591 |
| 6,499,743 B2 | * | 12/2002 | Sadowski | 277/593 |
| 6,554,286 B1 | * | 4/2003 | Tanaka | 277/591 |

* cited by examiner

Primary Examiner—William L. Miller
(74) Attorney, Agent, or Firm—Rader, Fishman & Grauer, PLLC

(57) ABSTRACT

An MLS combustion cylinder head gasket includes a relatively thick soft metal stopper having a square nosed aperture edge adapted to face a flame front in a cylinder head bore. The square nosed edge is designed to eliminate the trapping of hydrocarbons, which creates a major source of emission issues. The soft metal stopper is preferably formed of copper, although other soft metals capable of withstanding high temperatures may be employed. The stopper is formed of a malleable metal ring, and is formed over and about the edge of a combustion aperture edge of the gasket via a forming die that both shapes and clinches the metal ring respectively about and to the circumferential edge of each combustion aperture. The stopper, applied to the center spacer layer of the gasket, is adapted to flow into crevices and to thus "conform" to the normally variable spacing between engine block and cylinder head.

17 Claims, 1 Drawing Sheet

MLS GASKET WITH CONFORMABLE STOPPER ELEMENT

BACKGROUND OF THE INVENTION

1. Field of Invention

The present invention relates to improvements in multiple layer steel (MLS) cylinder head gaskets for automotive internal combustion engines, including gaskets having stopper layers situated adjacent edges of combustion cylinder bores, and particularly for providing enhanced sealing between cylinder bores.

2. Description of the Prior Art

Those skilled in the art will appreciate issues involved in both design and maintenance of a high quality seal between cylinder apertures of a cylinder block in an internal combustion engine and a cylinder head fastened to the block. In recent years, MLS cylinder head gaskets have become a preferred design choice, wherein all (typically at least three) gasket layers have been formed of steel. Beaded exterior layers have generally been fabricated of 301 stainless steel, a relatively robust metal with a high spring rate for meeting requisite performance requirements over useful gasket life. The center layer, also called a "spacer" layer, has generally been formed of less expensive metals, such as 409 stainless steel, or in some cases even zinc-plated low carbon steels, for meeting less rigorous requirements. Indeed, the center layer is rarely directly exposed to the harsh combustion gas environment of the engine.

It is desirable that areas immediately adjacent circumferential edges of engine cylinder bore apertures be subject to considerably greater stresses for assuring proper sealing as compared to areas of the gasket radially remote from the apertures. To meet the greater stress requirements at the bore edge areas, spacer layers are conventionally employed in areas that circumferentially surround each cylinder bore. The spacer layers often contain so-called stoppers designed to provide increased sealing pressures around the combustion apertures. In some cases, the stoppers have been formed of fold-over spacer layer metal, wherein the combustion edge of the spacer layer is extended and folded over or under primary sealing layers. In other cases, the stoppers have been formed as yet additional layers separately provided, e.g., discrete annular rings positioned about the aperture boundaries.

In many instances, the balance between a) the provision of desirable stresses and b) the strength of materials employed has been less than satisfactory. In such instances, the stopper layers have given rise to cracking phenomena at the boundaries of associated sealing beads surrounding the aperture boundaries. This has been a particular issue in narrow web regions between cylinder bores. In such small area regions, high stresses on the beads can exceed bead deflection stress capacity. Resultant cold working and associated bead cracking are detrimental to both the performance and longevity of gaskets that may otherwise provide reliable combustion sealing media. An improved resilient stopper and bead structure would be welcomed by the industry; particularly, one having a web area stopper structure capable of alleviating the noted nuisance cracking issues.

Another area for potential improvement involves the trapping of hydrocarbons within a cylinder head. The latter has been identified as a major source of internal combustion emissions. It is generally known that any crevice or interstice within the combustion chamber, including that produced by the interface of a U-shaped stopper ring and its adjacent mated planar sealing bead layers, is a potential source of trapped hydrocarbons, hence of undesireable pollutants or emissions. This invention provides an improvement directed to minimizing internal combustion emissions.

Finally, an additional area for potential improvement involves the non-uniformity, and hence non-linearity, of sealing stresses about the combustion aperture of a gasket. For example, to the extent that boltholes are arranged asymmetrically about the gasket, and that the shapes of the engine block and cylinder head parts are also asymmetric, there is normally a variable sealing stress gradient about the combustion aperture. Moreover, to the extent that it is relatively difficult to design a perfect variable stress gradient into a combustion aperture of a gasket, a conformable stopper would be a practical expedient. Thus, irrespective of the amount of torque applied to any particular bolt, a conformable stopper would act to provide variable stresses more desirably about the combustion aperture.

SUMMARY OF THE INVENTION

An MLS combustion cylinder head gasket includes a relatively thick soft metal stopper that provides a square nosed aperture edge adapted to face the flame front in a cylinder head bore. The square nosed edge is designed to eliminate the trapping of hydrocarbons, which has been identified as a major source of internal combustion emissions. The soft metal stopper is preferably formed of copper, although other soft metals capable of withstanding high temperatures may be employed, as well.

In one disclosed embodiment, the stopper is formed of a malleable metal ring, and is formed over and about the circumferential combustion aperture edge of the gasket by a forming die that both shapes and clinches the metal ring respectively about and to the aperture edge. In the described embodiment, the stopper is applied to a center spacer layer of the gasket. The stopper height is initially controlled by appropriately sizing the thickness of the metal ring from which the stopper is formed. Upon bolted securement of the gasket between engine block and cylinder head, however, the soft stopper material will flow into and follow the variable contours between block and head, and with thus "conform" to the normally variable spacing between those members.

In one described embodiment, the stopper is adapted to be positioned on an aperture edge of the center spacer layer situated between two full beads of mirror image outer metal layers of the gasket. The compensating aspect of the stopper is particularly realized in the web areas between cylinder bores, i.e., in the narrow areas defined by cylinder bore edges between any two adjacent cylinder bores.

DETAILED DESCRIPTION OF THE EMBODIMENTS

Figure 1:
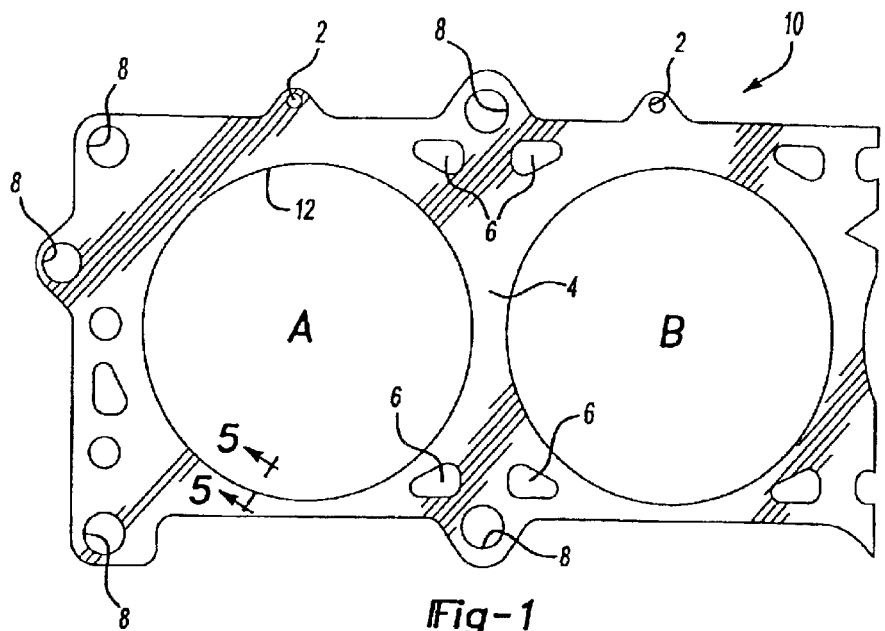
FIG. 1 is a fragmentary plan view of a three-layer MLS cylinder head gasket assembly adapted to seal a plurality of engine cylinder bore apertures of the type employed in internal combustion engines.

Referring initially to FIG. 1, a cylinder head gasket 10, generally of the type referred to as a multi-layered steel (MLS) gasket, is shown fragmentarily. The gasket 10 is adapted to be secured between a cylinder head and an engine block (neither shown) of a modern internal combustion engine (not shown). The gasket 10 depicts only a pair of cylinder bore apertures, A and B. Although only two cylinder bore apertures are shown in the fragmentary view, the gasket 10 of the described embodiment contains additional cylinder bore apertures, not shown. The bore aperture A has an edge 12 that is representative of the sealing boundaries of all of the circumferential cylinder bore apertures of the gasket 10.

Additional apertures, other than combustion bore apertures, are incorporated in the MLS gasket 10. These include grommet attachment apertures 2 for securing the gasket layers together, coolant apertures 6, and bolt holes apertures 8, each positioned and shaped as depicted. Still other apertures shown, but not specifically identified, are oil and bypass gas flow apertures, as will be fully appreciated by those skilled in the art.

Figures 2, 3:
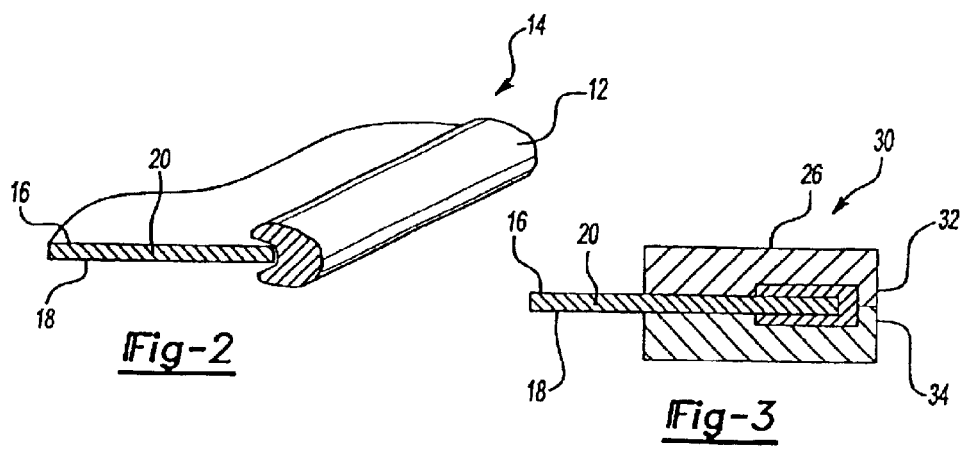
FIG. 2 is a fragmentary perspective cross-section view of a spacer layer of one described embodiment of the MLS cylinder head gasket of FIG. 1; this view depicts a stopper ring as initially positioned against an aperture edge of the spacer layer for subsequent application thereto.
FIG. 3 is a fragmentary cross-sectional view of the spacer layer of FIG. 2, with an overlapping metallic stopper having been shaped from the stopper ring by a forming die shown in place immediately after such formation; the forming die is particularly adapted for installing the stopper ring material under compression to the aperture edge of the spacer layer.
Figures 4, 5:
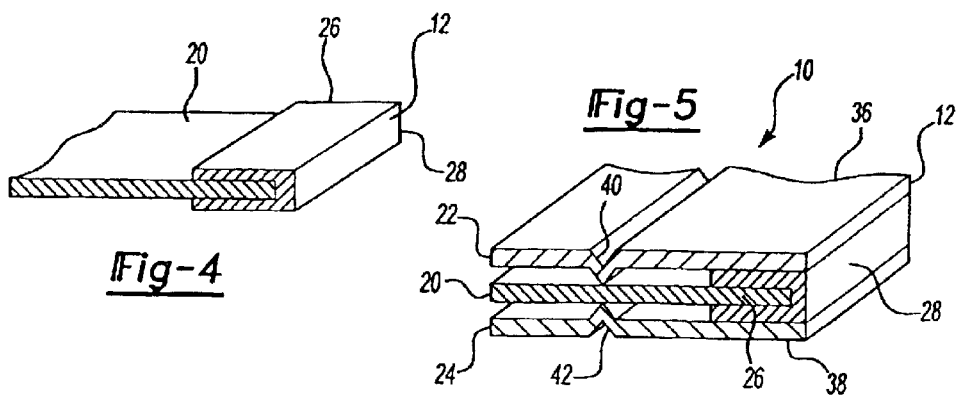
FIG. 4 is a fragmentary cross-sectional perspective view of the overlapping metallic stopper after its application to the spacer layer shown in FIGS. 2 and 3, and after the spacer layer part has been removed from the stopper-forming die.
FIG. 5 is a fragmentary perspective cross-section view of a portion of the three layer MLS cylinder head gasket, taken along lines 5—5 of FIG. 1, that includes the overlapping stopper situated at an edge of a cylinder bore in the finished gasket.

FIGS. 2–4 depict the formation of a spacer layer 20 employed in the cylinder head gasket 10. The gasket 10 (see FIGS. 1 and 5) incorporates, along with the layer 20, a pair of mirror image beaded exterior top and bottom layers 22, 24 (FIG. 5). Although only a fragmentary view of the spacer layer 20 is shown in FIGS. 2–4, the point of reference for FIGS. 2–4, i.e., at the aperture edge 12, is the same as that of FIG. 5, which is viewed along lines 5—5 of FIG. 1.

A variety of nonlinear variables impact effective combustion gas sealing between engine blocks and cylinder heads, and hence affect the design of a gasket. Generally, the engine areas and surfaces to be sealed are neither uniform in size nor shape, and the attachment bolt locations are often non-symmetrically arranged about the areas of the gasket to be secured.

One area particularly affected by the described asymmetrical relationships is a so-called web or inter-bore region 4 (FIG. 1), i.e., the area between combustion cylinder bore apertures. Not only do these areas have nonlinear shapes, they present particular challenges with respect to achieving sufficiently effective pressure patterns about the circumference of each of the cylinder bores to be sealed. For each particular gasket geometry, a proper sealing relationship must be established between a) resilient sealing beads 36, 38 (FIG. 5) situated in a top layer 22 and bottom layer 24, respectively, that sandwich the associated stopper layer 20 to limit amount of compression of the beads, and b) a stopper 26 fixed to the layer 20 and juxtapositioned between the beads. This invention provides a mechanism for assuring that an appropriate sealing bead configuration is achieved, irrespective of the asymmetrical pressure relationships existing between cylinder head and engine block, and particularly within web portions 4 that are positioned between combustion bore apertures, such as A and B. This is accomplished via use of a stopper formed of a malleable, conformable metal that surrounds each combustion cylinder bore aperture, e.g. bore A, of the MLS gasket 10.

Referring now specifically to FIG. 2, the spacer layer 20 is depicted fragmentarily as noted. A stopper ring 14 formed of a soft malleable metal, such as copper, is employed to produce a gasket stopper 26 at the edge 12 of a cylinder bore (e.g. A or B). The ring 14 may be formed of other comparable metals including brass, lead, etc. Referring now to FIG. 3, a stopper forming die 30, made of top and bottom sections 32 and 34 is employed to deform the stopper ring 14 into a die-formed stopper 26. The sections 32 and 34 are closed about the ring 14 until the die members 32, 34 engage the parallel planer surfaces 16 and 18 of the spacer layer 20. In FIG. 4, the forming stopper die 30 has been removed from the spacer layer 20, and the formed stopper 26 is shown having a body cross-section frictionally secured to edge 12 of the layer 20.

The stopper forming die 30 is adapted to produce a flat face 28 on the stopper 26. The face 28 is situated so as to address the flame front in an engine combustion chamber, and thus defines a square nosed aperture edge.

Referring now to FIG. 5, it will be apparent that the spacer layer 20, formed with its stopper 26, is sandwiched between mirror image top and bottom exterior layers 22 and 24 to form a three-layer MLS cylinder head gasket 10, as shown. The layers 20, 22, and 26 are secured together by grommets (not shown) that extend into the grommet apertures 2 (FIG. 1). It will be further appreciated that the layers 22 and 24 are beaded, and that the combustion bead 36 of the layer 22, and combustion bead 38 of the layer 24, are each positioned adjacent the stopper edge 12 of the cylinder bore A.

It will be further appreciated that the beads 36 and 38 depend radially from upper and lower bead fulcrums 40 and 42, respectively, that directly engage surfaces 16 and 18 of the spacer layer 20. The amount of compression applied to the beads 36 and 38 will be a function of several variables, including the loading imposed by bolts employed to secure the cylinder head to the engine block about the periphery of each combustion cylinder bore aperture A, B. The stopper 26, however, having been formed of a malleable material, will tend to conform to the variable pressures about the periphery of each bore aperture. As such, all interstices will tend to be filled by the flowable metal of the stopper 26.

Referring now briefly back to FIG. 1, the web area 4 is particularly suitable for a stopper that is relatively resilient, as the web area is particularly prone to issues of cylinder head liftoff and bead failure during the combustion cycle. The forming die 30 in the described embodiment is adapted to provide an initial variable thickness about the boundary of the bore apertures A, B, including the provision of a generally greater thickness in the web area 4.

Finally, it will be appreciated by those skilled in the art that the stopper layer 20, along with the beaded layers 22 and 24 are adapted to present a squared face to the combustion flame front. This is in contrast to the typical arcuate, U-shaped, cross-section stoppers of the prior art which engage the beaded layers 22 and 24 at acute angles, thus creating volumetric areas within the combustion chamber capable of trapping hydrocarbons, as will be appreciated by those skilled in the art. The present invention not only avoids such volumetric areas, but also provides a malleable, flowable stopper capable of accommodating a variable pressure gradient about the periphery of all combustion cylinder bore apertures.

In the described embodiment, the metal employed for the top and bottom layers 22 and 24 of the gasket 10 were 301 SAE stainless steel. The interposed spacer layer 20 was formed of 409 stainless or zinc plated low carbon steel.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A metallic engine combustion gasket having apertures adapted for making sealing registration with engine bores; said gasket adapted to be secured between generally planar mating structures for sealing therebetween; said gasket comprises a multiple layer steel gasket including a pair of beaded mirror image layers and a center spacer layer, a plurality of apertures in each of said layers and defining a circumferential edge having a soft malleable metallic stopper frictionally attached to said edge, said stopper comprising a generally conformable material adapted to flow into crevices and undulations when bolted into place between said mating structures, said stopper defining a generally planar face adapted to make contact with a combustion flame front and with said mating structures to reduce trapping of hydrocarbons within an engine bore, said mirror image layers sandwiching said spacer layer, wherein said stopper is attached to said spacer layer, and wherein all of said layers are adapted to be secured together prior to installation of said gasket between said generally planar mating structures, each of said apertures defining one mating aperture in registration with an aperture in each of the others of said layers, and wherein said beaded mirror image layers comprise sealing beads that sandwich said stopper at said edge.

2. The gasket of claim 1, wherein said apertures comprise cylinder head combustion bore apertures, and wherein said gasket is a cylinder head combustion gasket.

3. The cylinder head gasket of claim 1, wherein said generally planar mating structures comprise opposed mating surfaces of an engine block and a cylinder head.

4. The cylinder head gasket of claim 1, wherein said stopper comprises a copper metal material.

5. The cylinder head gasket of claim 1, wherein said stopper is shaped on said spacer layer via forming die.

6. The gasket of claim 1, wherein said beaded mirror image layers comprise stainless steel.

7. The gasket of claim 6, wherein said stainless steel is 301 SAE stainless steel.

8. The gasket of claim 1, wherein said stopper comprises a conformable material adapted to limit the amount of compression of said sealing beads.

9. A metallic engine combustion gasket comprising a multiple layer steel gasket including a pair of beaded mirror image layers and a center spacer layer, at least one aperture defining a circumferential edge having a soft malleable metallic stopper frictionally attached to said edge, said gasket adapted to be secured between generally planar mating structures for sealing therebetween, said stopper comprising a generally conformable material adapted to flow into crevices and undulations when bolted into place between said mating structures, said stopper defining a generally planar face adapted to make contact with a combustion flame front and with said mating structures to reduce trapping of hydrocarbons within an engine bore, said mirror image layers sandwiching said spacer layer, wherein said stopper is attached to said spacer layer, and wherein all of said layers are adapted to be secured together prior to installation of said gasket between said generally planar mating structures, and wherein said beaded mirror image layers comprise sealing beads that sandwich said stopper at said edge.

10. The gasket of claim 9, wherein said gasket comprises a plurality of apertures in each of said layers, each said apertures defining one mating aperture in registration with an aperture in each of the others of said layers.

11. The gasket of claim 9, wherein said apertures comprise cylinder head combustion bore apertures, and wherein said gasket is a cylinder head combustion gasket.

12. The cylinder head gasket of claim 9, wherein said generally planar mating structures comprise opposed mating surfaces of an engine block and a cylinder head.

13. The cylinder head gasket of claim 9, wherein said stopper comprises a copper metal material.

14. The cylinder head gasket of claim 9, wherein said stopper is shaped on said spacer layer via forming die.

15. The gasket of claim 9, wherein said beaded mirror image layers comprise stainless steel.

16. The gasket of claim 15, wherein said stainless steel is 301 SAE stainless steel.

17. The gasket of claim 9, wherein said stopper comprises a conformable material adapted to limit the amount of compression of said sealing beads.

\* \* \* \* \*